Jan. 28, 1964 B. A. HOLDEN 3,119,916

ELECTRIC SWITCH FOR USE OVER SUBSTANTIAL RANGES OF TEMPERATURE

Filed Sept. 16, 1960 2 Sheets-Sheet 1

Jan. 28, 1964 B. A. HOLDEN 3,119,916

ELECTRIC SWITCH FOR USE OVER SUBSTANTIAL RANGES OF TEMPERATURE

Filed Sept. 16, 1960 2 Sheets-Sheet 2

3,119,916

ELECTRIC SWITCH FOR USE OVER SUBSTANTIAL RANGES OF TEMPERATURE

Brian Astbury Holden, Newcastle-upon-Tyne, England, assignor to Burgess Products Company, Limited, Hinckley, England, a company of Great Britain and Northern Ireland Filed Sept. 16, 1960, Ser. No. 56,533
Claims priority, application Great Britain Oct. 19, 1959
4 Claims. (Cl. 200—168)

This invention relates to electric switches and is particularly applicable to switches which may be required to operate at high temperature or be subject to large temperature changes.

Electric switches are known in which metal components are supported by a base made from moulded plastic material. When exposed to great temperature changes, such for example as are encountered in furnaces, the plastic material deteriorates due to differential expansion with the metal components. Known switches intended for operation at high temperature use ceramic material instead of plastic material, but the difficulty of machining ceramic material and the different co-efficients of expansion of metal and of ceramic material not only make these switches difficult to manufacture, but also render them liable to early failure when in service.

An object of the present invention is to provide an electric switch suitable for use over substantial ranges of temperature which is easy to manufacture and which is reliable in service.

According to the invention there is provided an electric switch subject to large temperature changes comprising a base piece of insulating ceramic material having a ground face, a plurality of spaced holes through said base piece perpendicular to the face, metallic rivet sleeves traversing said holes, and switch components each secured by one end of one of said sleeves upon said face, which serves as a reference face for the correlation of the switch components in mutual assembly, a resilient washer on the other end of the sleeve bearing on a surface of the base piece opposite and parallel to the plane face for compensating differential expansion of the ceramic base and the metallic sleeves, and means engaging the other end of each sleeve and the opposite surface to prevent angular movement of the sleeve.

Figure 1:
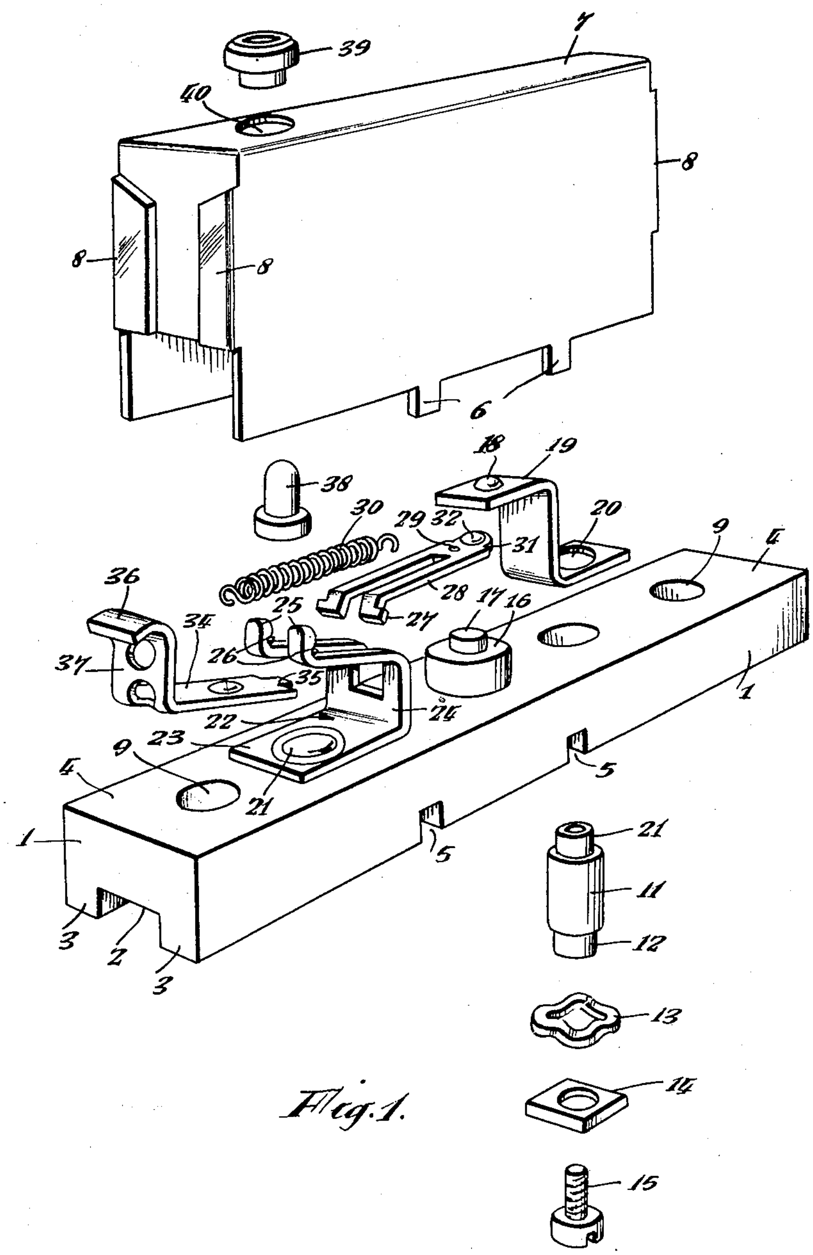
Figure 2:
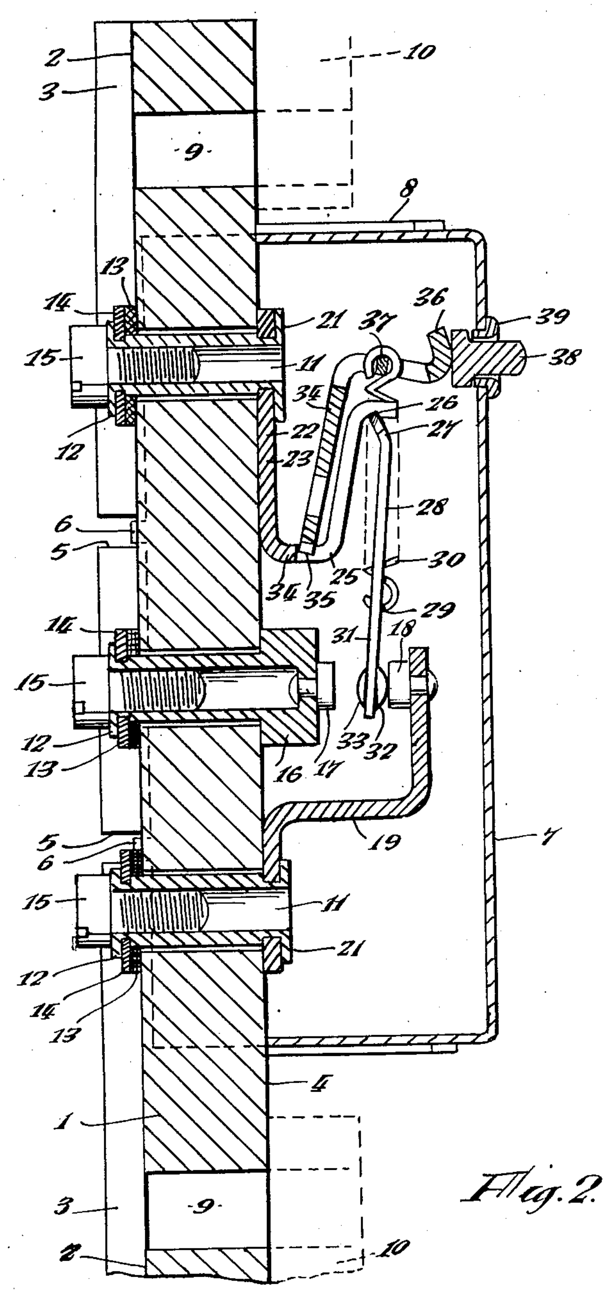

The invention will now be described with reference to the accompanying drawings, in which:

FIG. 1 is an exploded perspective view of a high temperature switch according to the invention, and FIG. 2 is a longitudinal cross-section of the switch of FIG. 1.

Referring to the drawings a base 1 consists of a single piece of ceramic material shaped as a parallelepiped having on its lower face a channel 2 between flanges 3. The upper face 4 of the base 1 is ground to provide a surface on which switch components are supported and which also serves as a mounting surface for the switch. The flanges 3 are interrupted at 5 to receive securing tags 6 on the side of a housing 7. The housing 7 is formed from a sheet of metal by molding down the sides and ends, the latter being held in position by reinforcing tags 8 on the sides of the housing. Five holes 9 penetrate the base 1, extending from the ground face 4 to the channel 2. The two end holes are used for mounting the switch in any suitable manner, e.g. by bolts (not shown) with the ground face 4 against a body 10 represented by broken lines in FIG. 2. The three central holes are used for securing switch components in their required positions. Sleeves, such as shown at 11, are inserted into the holes 9 and secured in suitable fashion, e.g. by riveting. The upper end of the sleeves may be adapted to suit the components supported, but the lower ends are the same in every instance, and consist of a reduced portion 12 which passes through a crinkle washer 13 and a further washer 14. The washer 14 has two opposed parallel sides which engage the pair of flanges 3, and is conveniently a square washer. After the switch component has been secured to the end of the sleeve 11 the end of the reduced portion 12 is riveted over the square washer 14 and the crinkle washer 13 is then held captive and partly compressed between the washer 14 and the surface of the channel 2, while the sleeve 11 is prevented from rotating in the hole 9 by the engagement of the sides of the square washer 14 with the flanges 3. The lower part of each sleeve is internally threaded to receive a terminal screw 15 by which an electrical conductor may be secured between the head of the screw 15 and the square washer 14.

The sleeve in the central one of the holes 9 has at its upper end a relatively deep flanged member 16 which closes the end except for a hole through which a rivet passes to support a stationary switch contact 17. By means of the flanged member 16 and the riveting of the reduced portion 12 over the square washer 14 the member 16 and the contact 17 are firmly supported on the ground face 4 of the base 1. The other stationary switch contact 18 is riveted to a support 19 consisting of a metal strip bent at right angles at two places in opposite senses, and having a hole 20 which registers with the right hand hole of the three central holes 9. A reduced portion 21 at the upper end of a sleeve 11 inserted in the hole 9 passes through the hole 20 and is riveted over, thereby securing the support 19 from turning on the sleeve 11 and holding it firmly against the face 4. Similarly a sleeve 11 in the left hand hole of the three central holes 9 supports a carrier 22 on the face 4, the carrier being incapable of rotation about the axis of the hole 9 by the action of the square washer 14.

The carrier 22 is made of one piece of metal, but for descriptive purposes may be regarded as consisting of a base 23 lying on the face 4, a crotch portion 24 at right angles thereto, and a pair of prongs 25 bent firstly so as to overlie and be approximately parallel to the base 23, and secondly so that the tips of the prongs are approximately parallel to the crotch portion 24. On the inner side of the second bend a notch 26 is cut in each prong 25.

Each notch 26 serves as a pivotal bearing for the bent down tips 27 of a U-shaped contact-carrying arm 28. The base of the U has a hole 29 which receives one end of a tension spring 30. The base of the U also has a lug 31 to which the upper stud 32 and the lower stud 33 of the movable switch contact are riveted. An actuator member 34, perforated for lightness, has a tongue 35 at one end. Towards the other end, the actuator 34 is bent approximately at right angles and again in the opposite sense, to provide a curved engagement surface 36. The tongue 35 engages the crotch portion 24 between the prongs 25, and prevents lateral displacement of the actuator member 34 during pivotal movement about its line of contact with the portion 24. By using the waist 37 between two adjacent perforations to receive the other end of the spring 30, the actuator member 34 can be actuated so as to move the spring 30 to control the contact-carrying arm 28 so that it operates with a snap action. An operating button 38, which slides in a bush 39 accommodated in a hole 40 in the housing 7, rests with its bottom in contact with the curved engagement surface 36 of the actuator member 34.

The operation of the switch is as follows: The switch is normally in the position shown in FIG. 2, i.e. with the stud 32 resting against the contact 18. When the operating button 38 is depressed, the actuator member 34 pivots about the crotch 24 until the movement of the waist 37 brings the axis of the spring 30 into alignment with the notch 26 and the hole 29 in the contact-carrying arm 28. As soon as this position is passed, the spring 30 contracts and causes the arm 28 to pivot about the notch 26 with a snap action. The stud 33 is now resting against contact 17 and the switch remains in this position until pressure is removed from the button 38. When pressure is removed from the button 38, the spring 30 contracts, causing the actuator 34 to pivot about the crotch 24, and restoring the button 38. As soon as the waist 37 passes the position in which it is aligned with the notch 26 and the hole 29 (in the operated position of the arm 28), the spring 30 causes the arm 28 to pivot about the notch 26, restoring the arm 28 to its original position with a snap action.

With a switch made in accordance with the above description, the switch components are held yieldingly but firmly in position against the ground face 4, which acts as a reference face not only for the components but also for mounting the switch, and any relative movement of the metal components and the ceramic at the rivets due to differential expansion is permitted by the yielding of the crinkle washers without the components becoming loose or the ceramic being crushed.

Whilst the invention has been described in connection with a high-temperature switch, the same construction can be used when the temperature changes take place at lower temperatures. It is of course essential that all the components of the switch as well as the base are made of materials which retain their characteristics e.g. shape, conductivity, insulation resilience etc., throughout the temperature range to which the switch will be exposed. For example, the crinkle washer may be stainless steel for a range of temperature from atmospheric up to 600° C. Where higher temperatures are experienced the crinkle washer may be made of a suitable nickel alloy, such as an alloy of the Nimonic series.

What I claim and desire to secure by Letters Patent is:

1. An electric switch subject to large temperature changes comprising a base piece of insulating ceramic material having a ground plane face, a plurality of spaced holes through said base piece perpendicular to said face, metallic rivet sleeves traversing said holes, and switch components secured each by one end of one of said sleeves upon said face, which serves as a reference face for the correlation of said components in mutual assembly, a resilient washer on the other end of each sleeve bearing on a surface of said base piece opposite and parallel to said plane face for compensating differential expansion of said ceramic base and said metallic sleeves, and means engaging said other end of each sleeve and said opposite surface to prevent angular movement of said sleeve.

2. An electric switch subject to large temperature changes comprising a base piece of insulating ceramic material having two opposite faces of which one is a ground plane face and the other has a channel of rectangular section the base of which is parallel to said plane face, a plurality of spaced holes through said base piece extending perpendicularly between said plane face and the base of said channel, metallic rivet sleeves traversing said holes, and switch components secured each by one end of one of said sleeves upon said face, which serves as a reference face for the correlation of said components in mutual assembly, a resilient washer on the other end of each sleeve bearing on the base of said channel for compensating differential expansion of said ceramic base and said metallic sleeves and a washer formed to be non-rotatable in said channel bearing on said resilient washer, said other end of each sleeve being riveted over said non-rotatable washer.

3. An electric switch subject to large temperature changes of the kind comprising two fixed stop elements, at least one fixed contact supported by one of said fixed elements, a pivoted element, at least one contact carried by said pivoted element for engagement with and disengagement from said fixed contact, a carrier for said pivoted element and resilient actuating means for said pivoted element, in combination with a base piece of insulating ceramic material having two opposite faces of which one is a plane ground face and the other has a channel of rectangular section, the base of said channel being parallel to said plane face, a plurality of holes extending perpendicularly between said plane face and the base of said channel, three metallic sleeves located each in one of said holes, one end of one of said sleeves serving to secure said carrier and one end of each of the other two sleeves serving to secure said fixed stop elements, all upon said plane face as a reference face for the correlation of said carrier and said elements, a resilient washer on the other end of each sleeve for bearing on the base of said channel for compensating differential expansion of said ceramic piece and said metallic sleeve, and means engaging said other end of each sleeve and said opposite surface to prevent angular movement of said sleeve.

4. An electric switch of the kind comprising two fixed stop elements, at least one fixed contact supported by one of said fixed elements, a pivoted element, at least one contact carried by said pivoted element for engagement with and disengagement from said fixed contact, a carrier for said pivoted element and resilient actuating means for said pivoted element, in combination with a base piece of insulating ceramic material having two opposite faces of which one is a ground plane face and the other has a channel of rectangular section, the base of said channel being parallel to said plane face, a plurality of holes extending perpendicularly between said plane face and the base of said channel, three sleeves located each in one of said holes, one of said sleeves serving to secure said carrier and the other two sleeves serving to secure said fixed stop elements, all upon said plane face as a reference face for the correlation of said carrier and said elements, a crinkle spring washer on the other end of each sleeve bearing on the base of said channel, and a square washer non-rotatable in said channel bearing on said spring washer, said other end of each sleeve being riveted over said square washer.

References Cited in the file of this patent

UNITED STATES PATENTS

| | | |
|---|---|---|
| 648,710 | Quelch | May 1, 1900 |
| 1,017,172 | Ryan | Feb. 13, 1912 |
| 2,547,866 | Hingelberg | Apr. 3, 1951 |
| 2,582,984 | Gray | Jan. 22, 1952 |
| 2,700,079 | Haydon | Jan. 18, 1955 |
| 2,962,691 | Mande et al. | Nov. 29, 1960 |

FOREIGN PATENTS

| | | |
|---|---|---|
| 16,188 | Great Britain | July 15, 1907 |
| 663,684 | Great Britain | Dec. 27, 1951 |